United States Patent
Kleppen

[11] Patent Number: 5,519,185
[45] Date of Patent: May 21, 1996

[54] METHOD OF INSULATING A WELDING TORCH AND THE RESULTING TORCH

[75] Inventor: Arthur L. Kleppen, Kent, Wash.

[73] Assignee: C-K Worldwide Inc., Auburn, Wash.

[21] Appl. No.: 399,914

[22] Filed: Mar. 7, 1995

[51] Int. Cl.⁶ ........................................ B23K 9/28
[52] U.S. Cl. ........................ 219/137.31; 219/75
[58] Field of Search ............... 219/136, 75, 121.48, 219/137.31, 144

[56] References Cited

U.S. PATENT DOCUMENTS

| | | | |
|---|---|---|---|
| 1,314,674 | 9/1919 | Kuntzmann | 219/144 |
| 2,163,486 | 6/1939 | De Long | 219/144 |
| 3,610,866 | 10/1971 | Harvey et al. | 219/70 |
| 3,634,643 | 1/1972 | Himmelman | 219/75 |
| 3,823,320 | 7/1974 | Muehlberger | 219/121 P |
| 4,771,158 | 9/1988 | Kleppen | 219/75 |
| 4,788,401 | 11/1988 | Kleppen | 219/75 |
| 5,162,632 | 11/1992 | Carkhuff | 219/121.48 |

*Primary Examiner*—Clifford C. Shaw
*Attorney, Agent, or Firm*—Keith D. Gehr

[57] ABSTRACT

The invention is a method of insulating an electric welding torch and the torch produced by the method. The insulation is applied in three layers. The inner layer applied directly over the metallic elements is preferably a heat resistant elastomer such as silicone rubber. The middle layer is a reinforcing fiber, preferably a heat resistant glass cloth. The outer layer is also a heat resistant elastomer. The preferred manufacturing method is to apply the first two layers and compression mold this to form a first assembly. After trimming any flash another layer of heat resistant elastomer is applied over the outside and the product is again placed in a compression mold. The process compensates for the very poor flow characteristics of the elastomer, ensures that the reinforcing is well contacted and wet out by the elastomer, and produces a product of excellent appearance and durability.

11 Claims, 1 Drawing Sheet

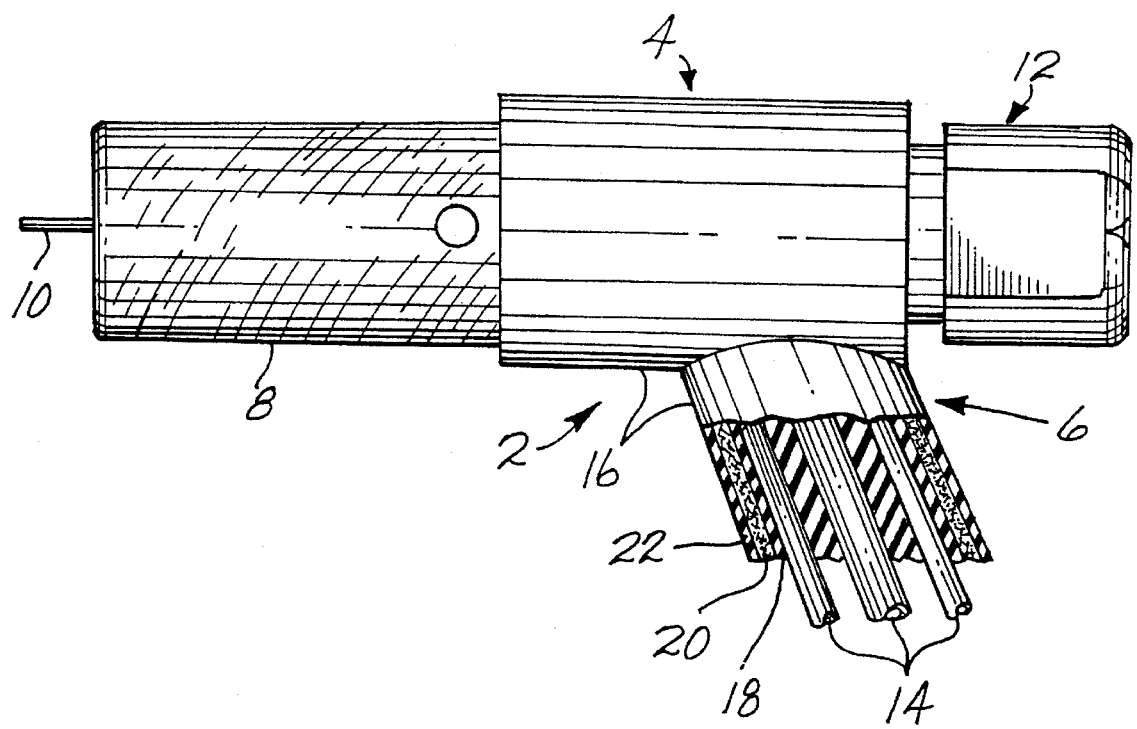

1

METHOD OF INSULATING A WELDING TORCH AND THE RESULTING TORCH

The present invention is directed to a method for covering an electrical welding torch with a heat and abrasion resistant insulated covering and to the product produced by that method. The method is particularly useful for insulating inert gas and plasma welding torches.

BACKGROUND OF THE INVENTION

Welding techniques in which a blanket of inert gas is maintained over the weld area have been available for many years. These use torches that have either a fixed tungsten electrode or a consumable metal electrode with a blanketing gas that is normally argon or helium. In comparison with the usual arc welding procedures, the inert gas welding torches are normally used in closer proximity to the weld zone. Plasma jet torches using an exceedingly hot stream of ionized gas to effect fusion are used in a similar manner. These torches are subject to a very high heat environment which tends to rapidly degrade the outer layer of insulation used over the electrically conducting interior metallic elements. Part of this degradation is due to physical damage from the cuts and scrapes which inevitably occur during normal use. This is greatly exacerbated when the insulation is softened from the heat and it becomes much more subject to abrasion and cuts. The net result of insulation degradation is a prematurely shortened life to an otherwise useful torch.

The usual insulating materials for inert gas or plasma welding torches are heat resistant phenolic molding materials or an elastomer such as a rubber composition. Both are usually applied by compression molding or otherwise forming the polymeric material around the preassembled metallic elements of the torch. Silicone rubber materials in particular, which are generally preferred because of their excellent heat resistance, have extremely poor flow characteristics. By this is meant that they require very high pressures and temperatures to make them conform to a mold without leaving knit lines and void areas. They are usually supplied as uncured sheets which are then cut into strips and hand wrapped around the metallic torch components prior to placing this assembly in a compression mold. Usually a considerable amount of excess rubber is required to make parts of acceptable appearance. This excess is squeezed from the mold as flash which is then trimmed after the part has been removed and cooled somewhat. After the molding cycle, the part is then placed in an oven for a relatively long period to complete cure of the rubber. The curing process induces cross linking of the heat resistant polymers so that they become thermoset; i.e., they cannot be molded further by heat or pressure.

Even in their fully cured state the rubber jackets are relatively soft and lack the toughness of vulcanized carbon reinforced synthetic rubbers such as those used in tires and hoses. As noted above, the insulation on a welding torch is subject to damage from abrasion or cuts simply due to the rough environment in which it is normally used. This is in addition to deterioration due to the heat. Further, as heat deterioration begins to take place mechanical damage occurs more readily and ultimately the rubber coating will begin to spall off then break out in chunky pieces.

Attempts have been made previously to deal with the problem of insulation reinforcement. Muehlberger, in U.S. Pat. No. 3,823,302 shows a plasma jet torch that, without providing further elaboration, uses an insulating member described as being "a fiber glass-resin composition". Harvey, in U.S. Pat. No. 3,610,866, describes a torch with a conductive metal element encased in an electrical insulating sleeve "such as fiberglass coated with silicon rubber". Again the inventor provided no further information other than the brief phrase quoted.

Attempts to reinforce silicone rubbers or other rubber-like elastomers such as neoprene with fibrous glass mats or woven fabric have not been very successful in the past. This is due to the poor flow characteristics of the rubbers caused by an exceedingly high viscosity under molding conditions. Appearance has been very poor for this reason. It is highly unlikely that a successful product could be made, as Harvey seems to suggest, by first wrapping the torch with glass reinforcement and then applying the rubber as a wrap or in some other manner. Metal pans to be coated with elastomers must first be primed to ensure good adhesion of the rubber to the portion being covered. If the glass was placed under the rubber; i.e., adjacent to the metallic parts as Harvey appears to teach, flow of the rubber through the glass mat would likely be so poor that there would be minimal, if any, bonding between rubber and metal.

The present invention is directed to a process of insulating a torch with a heat curable polymeric jacket that overcomes the problems noted and produces a product of excellent appearance and durability.

SUMMARY OF THE INVENTION

The present process is directed to a process of insulating an electrical welding torch, such as an inert gas or plasma torch, using a reinforced polymeric coating such as a phenolic prepreg or rubber composition. The invention is further directed to a torch produced by the process. The product has particularly improved mechanical durability due to its resistance to damage from cuts and abrasion encountered during use. As a result the useful life of the torches is significantly extended.

In the practice of the method, the metallic elements of the torch are assembled in the usual manner and then covered; e.g., by wrapping with strips of an uncured rubber composition. This is conventional practice to this point. However, in the present invention, following this step the rubber composition is then wrapped with a heat and abrasion resistant fiber reinforcing material to form a first assembly. Over this is applied a second wrapping of a rubber composition to form a second assembly which is then placed in a mold; e.g., a compression mold, for the requisite length of time. The rubber composition is able to penetrate the reinforcing fiber layer from both directions thus achieving better wetting of the fiber. In addition, the fiber-free layer of rubber on the outside of the piece contributes significantly to improved appearance.

In the most preferred practice an intermediate molding step is used. The reinforcing fiber wrapped first assembly is placed in a first mold. After the appropriate molding cycle the part is removed and any flash is trimmed. It is then wrapped with the second layer of rubber composition to form the second assembly. This is again placed in a mold of somewhat larger internal dimensions than the first and a final molding cycle takes place. After flash is again trimmed the part may be subjected to any necessary post baking step to complete cure of the rubber composition.

It is an object of the present invention to provide a method of manufacturing an insulated welding torch in which the insulation has greatly improved durability.

It is another object to manufacture a welding torch having reinforced insulation that is highly resistant to heat, abrasion, and cuts.

It is also an object to provide a welding torch of improved stiffness and durability.

These and many other objects will become readily apparent upon reading the following detailed description.

BRIEF DESCRIPTION OF THE DRAWING

The single FIGURE shows a typical inert gas welding torch having insulation comprising the novel construction of the present invention.

DETAILED DESCRIPTION OF THE PREFERRED EMBODIMENTS

The present inventor's earlier U.S. Pat. No. 4,788,401 shows a tungsten inert gas (TIG) welding torch that can be considered exemplary of one for which the present invention would be applicable. The torch includes metallic elements which conduct electricity and inert gas to the weld zone, hold the electrode, and conduct cooling water to the locus where the heat is most intense. It comprises a water cooled head portion in which the tungsten electrode is located and an angularly offset handle held by the welder. Both of these are enclosed in polymeric molded-on insulation. In normal practice this insulation would be a heat resistant silicone rubber.

Referring to the drawing, a typical inert gas welding torch is shown generally at 2. This has a head portion 4 and a handle 6. Anterior to the head is a gas cup 8 surrounding an electrode 10. The position of the electrode is controlled by knob 12. Metallic lines 14 conduct inert gas to the weld area and coolant to the head portion of the torch. The head and handle are surrounded by a molded structure 16 serving as thermal and electrical insulation. As shown in the cut-away portion on the handle, the insulation consists of an inner layer 18, typically a thermosetting elastomer. This is surrounded by a mid-layer 20 which is preferably a woven glass fabric. Finally an outer layer 22 of elastomer or other polymeric material completes the construction.

In the practice of the present invention the metallic parts would first be coated with a primer to improve the adhesion of the polymer. One suitable primer for silicone rubbers is Dow Corning S-2260 material, available from Dow Corning Corporation, Midland Mich. The primed torch elements are then wrapped with approximately 30 g of an uncured silicone rubber material. One material found to be satisfactory is available in sheet form from General Electric Corporation, Chino, Calif. as GE 22800 silicone rubber. This is cut into strips about 25–50 mm wide for application. Following application of the silicone rubber a band of a heat resistant reinforcing fiber is wrapped over the rubber. One of the products found to be very satisfactory is Markel Thermoflex® T561B5W000 heat resistant woven glass fiber. This is available from Markel Corporation, Norristown, Pa. The doubly wrapped torch is then placed in a compression mold and molded at 190° C. (375° F.) and 82,500 kPa (12,500 psi) for 10 minutes. After removal from the mold and cooling, the flash is trimmed from the part and it is wrapped again with about 30 g of the uncured silicone rubber strips. It is once more placed in a mold, this time one having a somewhat larger cavity than the first. Molding conditions are the same as for the initial molding cycle. After removal and flash trimming the part is then post baked in an oven at 202° C. (395° F.) for 4 hours to complete cure of the silicone rubber compound.

While the products just noted have been found quite satisfactory, similar materials from other suppliers are expected to be equally useful. Their being listed above should not be considered as an endorsement of these particular products over those of other manufacturers. Other thermosetting heat moldable polymeric insulating materials besides silicone rubbers are also considered to be suitable.

Because of the complex shape of the part it is not possible to place the glass wrap neatly. There is always some overlap and wrinkling. This does not affect the insulation functionally but it significantly detracts from the appearance of the part after the first molding cycle since the glass remains visible on the surface. By applying the second layer of rubber the glass is completely enclosed and protected. Both sides of the glass wrap are then well wet out with the silicone rubber compound so as to provide maximum reinforcement.

While the process may be completed in a single molding cycle the double cycle is preferred. The considerable compression ratio required because of the relatively loosely wrapped rubber sheets and reinforcing material is exaggerated even more when a three ply construction is molded in a single cycle.

While a woven glass fiber cloth is the preferred reinforcing material, other forms such as laid glass mats or roving are also satisfactory. High silica glasses offer somewhat better heat resistance than ordinary soft glasses.

Insulation failure on unreinforced torches usually proceeds by an initial surface flaking or spalling followed by progressively larger pieces breaking out. This type of failure is almost completely prevented by using the reinforcing process of the present invention. Torch life is typically prolonged by a factor of 2 to 3 times. Even when heat deterioration of the polymeric material has occurred the reinforcement layer greatly reduces sloughing and prevents discrete chunks from breaking out of the insulation.

There is an additional unexpected advantage found in torches produced by the present process. The metallic structure in the handle portion usually consists of nothing more than three relatively small diameter soft copper tubes. Two of these carry cooling water and the other the inert gas. Even when covered with the normal silicone rubber insulation the torch handle is quite flexible and easily bent. The reinforced insulation of the present invention contributes significant stiffness and rigidity to the entire torch.

Other polymeric materials beside silicone rubber should be considered as functionally equivalent. Neoprene rubbers would be one example of these. It is quite possible to use a combination of rubber compositions under or over a phenolic molding compound or prepreg. While these and other variations of the product and process described above may be apparent to those skilled in the art, it should be understood that the invention should be considered as limited only as it is defined in the following claims.

I claim:

1. A method for insulating an electrical welding torch which comprises:

providing the assembled metallic components of a welding torch;

covering the metallic components with a first wrapping of an uncured heat resistant and heat curable polymeric composition;

wrapping the uncured polymeric composition with a heat and abrasion resistant reinforcing fiber material to form a first assembly;

covering the first assembly with a second wrapping of uncured resistant and heat curable polymeric composition to form a second assembly; and molding the second assembly to a achieve a desired physical configuration and at least partially cure the polymeric composition, whereby the torch is covered with a heat, cut, and abrasion resistant covering of good appearance without exposed fiber material.

2. The method of claim 1 which includes the further step of molding the first assembly to a first physical configuration prior to applying the second wrapping of heat resistant and heat curable polymeric composition.

3. The method of claim 2 which includes the further step of removing any flash from the first molding step prior to applying the second wrapping of polymeric composition.

4. The method of claims 1, 2, or 3 in which the polymeric composition is a heat resistant silicone rubber.

5. The method of claim 4 in which the uncured silicone rubber is provided in flat sheet form.

6. The method of claim 1 in which the heat and abrasion resistant reinforcing fiber is a woven glass fiber.

7. The method of claim 6 in which the glass fiber is a high silica glass.

8. A electric welding torch which comprises:

inner metallic components to conduct a gas and cooling water;

at least a portion of said metallic components being covered with an insulation material formed from at least three layers which in turn comprise;

a first layer of a heat resistant polymeric composition adjacent to the metallic elements;

a second layer of a fibrous heat and abrasion resistant reinforcing material; and a third layer of a heat resistant polymeric composition, said layers being molded by heat and pressure to a desired configuration, the reinforcing material providing additional stiffness and rigidity to the torch and serving to extend the useful life by protecting the insulation against deterioration encountered during use.

9. The welding torch of claim 8 in which the heat resistant polymeric composition is a silicone rubber.

10. The welding torch of claim 8 in which the reinforcing material of the second layer is fibrous glass.

11. The welding torch of claim 10 in which the glass is in the form of a woven cloth.

* * * * *